July 11, 1944.    B. FORD    2,353,131
GRINDING MACHINE
Filed Dec. 10, 1941    3 Sheets-Sheet 1
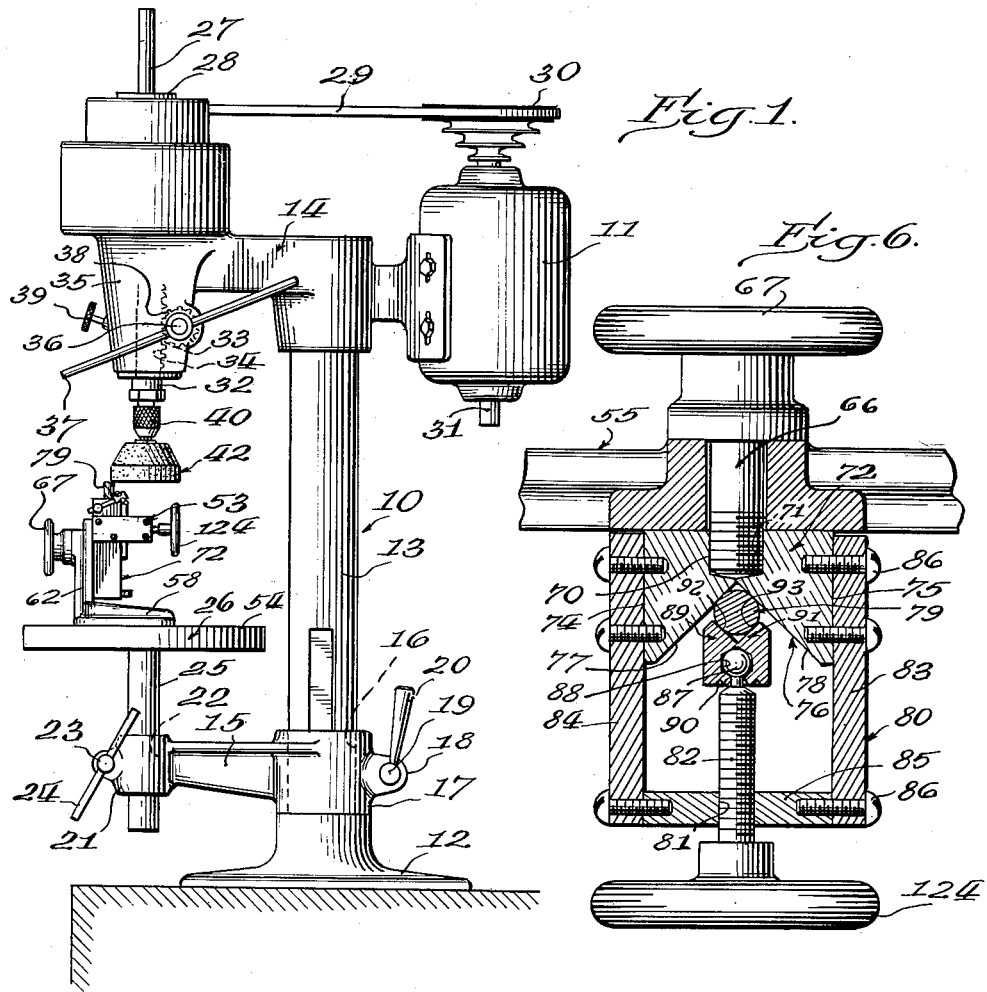
Inventor
Brandt Ford
By McCaleb, Wendt & Dickinson
Attys.

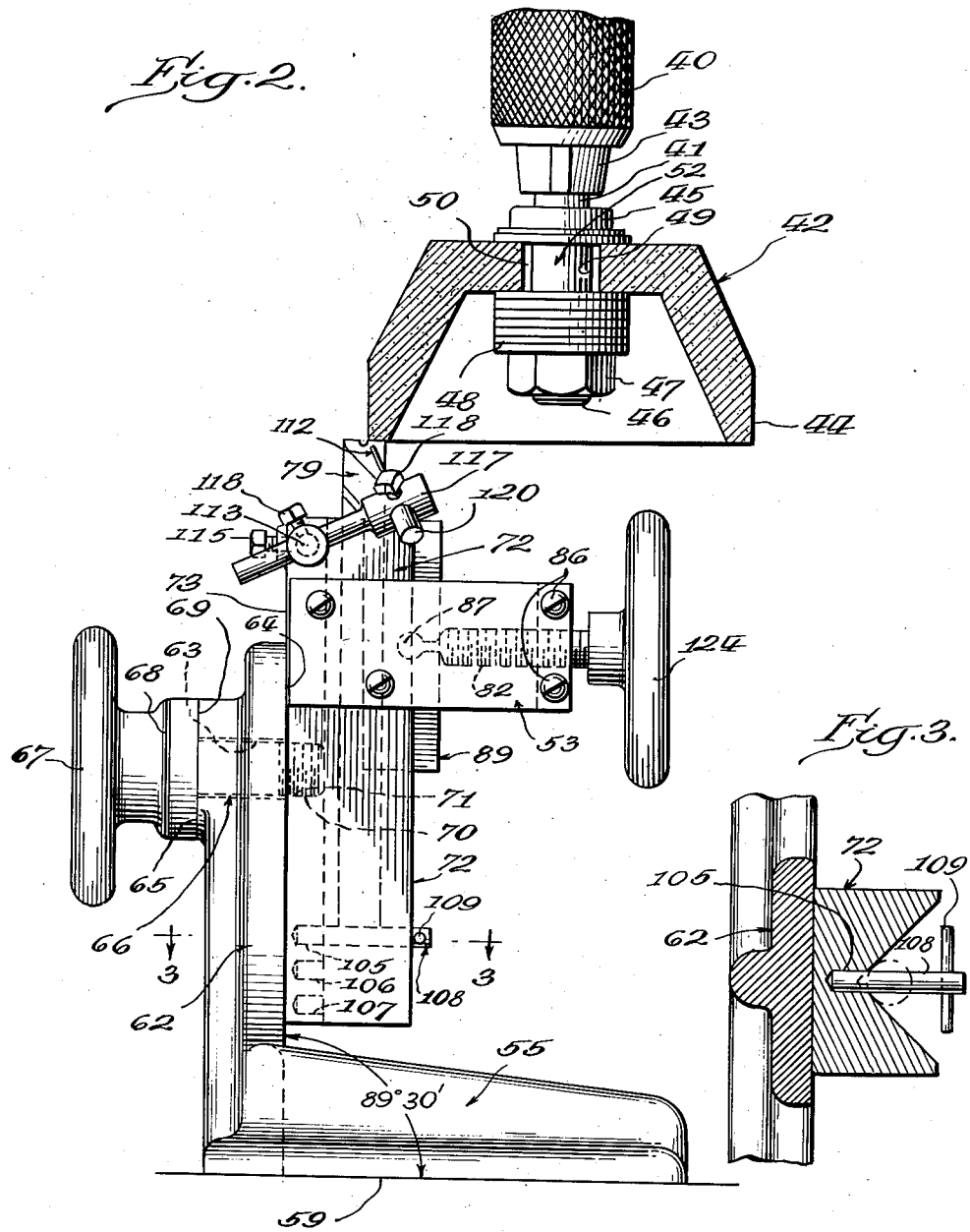

July 11, 1944.  B. FORD  2,353,131

GRINDING MACHINE

Filed Dec. 10, 1941    3 Sheets-Sheet 3

Inventor
Brandt Ford
By McCalet, Wendt & Dickinson
Attys

Patented July 11, 1944

2,353,131

UNITED STATES PATENT OFFICE 2,353,131

GRINDING MACHINE

Brandt Ford, Racine, Wis.

Application December 10, 1941, Serial No. 422,357

3 Claims. (Cl. 51—125)

The present invention relates to grinding machines, and is particularly concerned with grinding machines adapted to be used for grinding any tool that cuts on its end.

Among the end cutting tools which may be ground are end milling cutters, some other milling cutters, bottoming tools, reamers, and spot facers.

The grinding machines may also be used for grinding slabbing cutters for milling machines and for grinding taps, dies, and special tools.

One of the objects of the invention is the provision of a simple grinding assembly which may be so economically manufactured that it can be economically employed in small shops where the quantity of end mills to be ground is very small.

Another object of the invention is the provision of an improved grinding fixture adapted to be used with an ordinary power driven drill press, the grinding wheel being held and rotated by the chuck of the drill press, and the fixture being slidably mounted on the table of the drill press and guided by hand to permit the grinding of various tools.

Another object of the invention is the provision of a fixture of the class described which is simple, capable of being manufactured cheaply, and which has provision for providing the cutting edges of end milling cutters with a proper inwardly depressed slope, and with a land behind the cutting edge, having any suitable clearance desired.

Another object of the invention is the provision of an improved method of handling a cutter to be ground, and handling a grinding wheel in such manner that the work is readily visible and the cutting edges of the tool may be very quickly and economically ground.

Another object of the invention is the provision of an improved fixture of the class described, which has a provision for holding the tool to be ground against rotation, and provision for holding the tool at any desired clearance angle, and provision for automatically holding the tool at such an angle that the cutting edges of an end milling cutter are sloped downwardly toward their inner ends when the cutter is held with its cutting edges upward.

Another object of the invention is the provision of a grinding fixture of the class described, which has means for indicating the angular clearance of the land behind the cutting edge as produced by action of this grinding fixture, and which may be used on right hand and left hand cutters and cutters of various lengths, including very long ones and very short ones.

Other objects and advantages of the invention will be apparent from the following description and the accompanying drawings, in which similar characters indicate similar parts throughout the several views.

Referring to the three sheets of drawings,

Fig. 1 is a side elevational view of a drill press equipped with a fixture constructed according to the invention, showing the complete assembly of my grinding machine;

Fig. 2 is a full sized elevational view in partial section, showing the fixture and grinding wheel as they appear upon the completion of the grinding of one of the cutting edges of an end milling tool;

Fig. 3 is a fragmentary sectional view, taken on the plane of the line 3—3 of Fig. 2, looking in the direction of the arrows;

Fig. 6 is a fragmentary horizontal sectional view, taken on the plane of the line 6—6 of Fig. 5, looking in the direction of the arrows;

Fig. 7 is a fragmentary side elevational view of an end milling cutter which has just had its cutting edges ground according to the present invention;

Fig. 8 is an end view of the cutter of Fig. 7; and

Fig. 9 is another fragmentary side elevational view, taken from the left side of Fig. 7.

Figure 4:
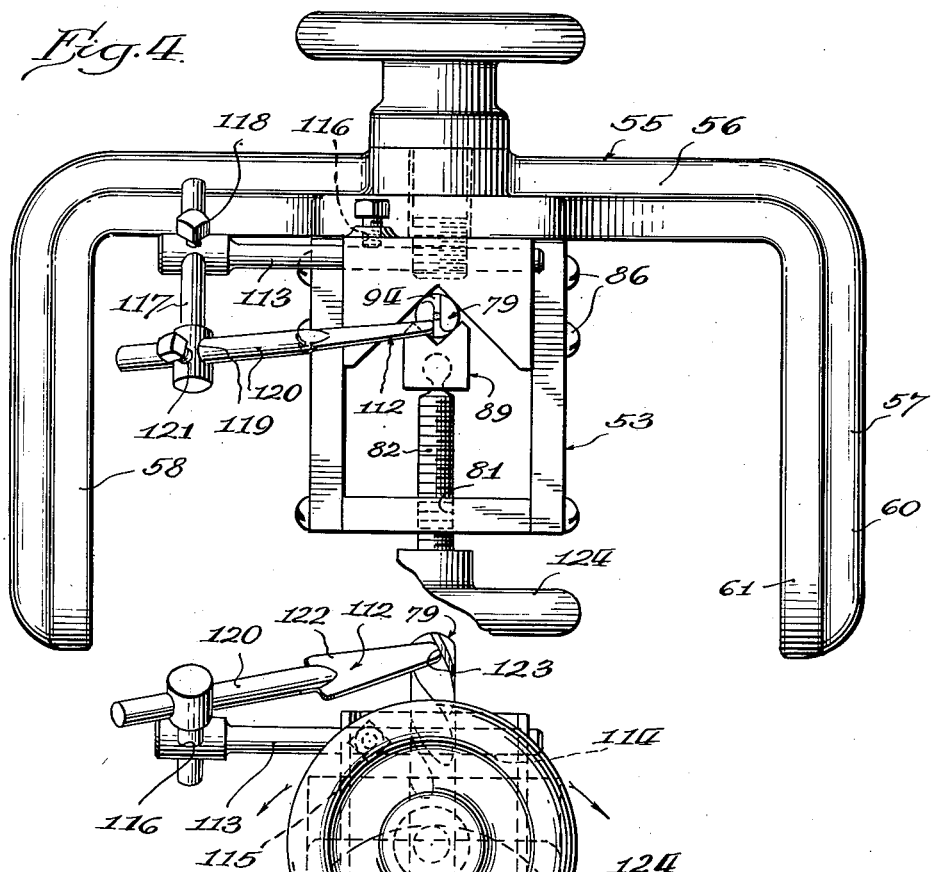
Fig. 4 is a top plan view of the fixture as it appears apart from the drill press.

Referring to Fig. 1, 10 indicates in its entirety a drill press, which may be of any standard type and driven with an individual electric motor 11 or from a line shaft. The drill press preferably includes a base 12, which supports a column 13 for supporting the head 14.

The column 13 also supports an adjustable table arm 15, which has a cylindrical bore 16 for slidably receiving the cylindrical column 13. The arm 15 has its bore 16 in a split collar 17, the two open legs of which may be indicated at 18, and which are adapted to be drawn together by a threaded member 19 actuated by a handle 20.

The table arm 15 may have another split collar 21 at its opposite end, provided with a cylindrical bore 22, and with a threaded member 23 actuated by the handle 24 for clamping the cylindrical shank 25 of the table 26 at the desired elevation.

The table 26 comprises a circular metal disc, the upper surface of which is usually ground to a perfectly flat and plane surface, and it may be provided with the usual slots and centrally located aperture for receiving the drill bit as it passes through a piece of work.

The head 14 may be fixedly secured by any convenient fastening means on the upper end of the column 13, and it comprises a cast metal member, having bearings for rotatably supporting the vertical shaft or spindle 27.

The shaft 27 in this embodiment carries a plurality of V pulleys 28 for engagement with the V belt 29, which also engages one of the V pulleys 30, which are mounted on the motor shaft 31. The motor 11 is fixedly secured in this embodiment to the rear side of the upper fixture or head 14, and the size of the pulleys 28 and 30 are graduated so that the length of the belt 29 may remain constant, but the spindle 27 may be driven at various rates of speed.

The spindle 27 has its bearing sleeve 32 provided with a rack 33, and the bearing sleeve is non-rotatable, but slidably mounted in suitable guide members 34 so that it may be moved up and down by means of a pinion engaging the rack 33 inside the housing 35.

The pinion is mounted on the inner end of the shaft 36, which may have an elongated handle 37 so that a predetermined amount of pressure may be applied to the spindle 27 in its usual drilling operations.

The hub 38 surrounding the shaft 36, carried by the housing 35, may be provided with a pointer, and the rotating shaft 36 with a collar, having indicia at 38 for indicating the position of the spindle 27 in a vertical direction.

The drill press is provided with a locking device 39 of any convenient type, such as a member threaded into the housing 35, and having a conical point engaging the guide 32 for holding the spindle 27 at any desired elevation.

The lower end of the spindle 27 carries any standard type of chuck 40, ordinarily used for holding drill bits; and in the present embodiment for receiving and holding the shank 41, which supports the grinding wheel 42, by means of the jaws 43 of the chuck 40.

Any desired type of grinding wheel may be employed, but I prefer to use a grinding wheel of the cup type, having a plane lower edge 44 of annular shape for the working surface of the grinding wheel in the grinding of end milling cutters. This grinding surface 44 is maintained in a plane condition and at right angles to the axis of the shank 41 by means of suitable dressing tools, which may also be held in my fixture.

The shank 41 of the stub shaft, which holds the grinding wheel 42, is preferably provided with an annular thrust collar 45 and with a threaded end portion 46, so that the nut 47 may be used to clamp the grinding wheel 42 against the shoulder 45 with as many washers 48 as are found desirable or necessary.

Such grinding wheels preferably are provided with the centrally located aperture 49 in a metal bushing 50 carried by the grinding wheel 42 for engaging the stub shaft 52.

It should be understood that various shapes of cup grinding wheels and other grinding wheels may be used, and they may be used with or without guards.

The improved fixture which forms a part of the complete combination of Fig. 1, is indicated in its entirety by the numeral 53, and it is adapted to be placed upon the plane surface 54 of the table 26 and moved around on that surface by hand in the grinding operation.

The fixture 53 is preferably provided with a base member 55, which may be of substantially U shape, as shown in Fig. 4, including a straight rear portion 56 and a pair of backwardly extending leg portions 57, 58.

The bottom of the base 55 is provided with a plane surface 59 on all of the portions 56, 57, 58, and the surface 59 is ground to a perfectly smooth and accurate plane surface, as it is this surface which determines the position of the tool with respect to the grinding wheel.

The portions 56, 57, 58 of the base may be substantially T shape in cross section, having an upwardly extending rib 60 on its top and outer portion for reinforcing the base. The laterally projecting flange 61 on the base increases its bearing area.

The straight portion 56 of the base may be provided with an upwardly extending column 62 of T shape in cross section, and the column is provided at its upper end with a transversely extending cylindrical bore 63.

On its rear side, as it appears on the drill press, that is, the right side, column 62 is provided with a perfectly plane surface 64, and on its front side, that is, the left of the fixture in Fig. 1, it is provided with another annular plane surface 65 surrounding the bore 63. The plane surfaces 64, 65 are preferably parallel to each other, but they are at an angle of slightly less than 90 degrees to the plane surface 59 on the bottom of the base for the purpose of hollow grinding an end milling cutter which is to be ground in the fixture.

The exact angularity of the surfaces 65 and 64 or the column 62 with respect to the bottom 59 and base 55 depends on the angle at which the cutting edges of the milling cutter are to extend; but I prefer to make this angle approximately 89°, 30′, as indicated on Fig. 2.

The bore 63 supports a shaft 66, which is carried at its outer or front end by a hand wheel 67. The hand wheel 67 preferably has a hub 68 with a plane annular surface 69 engaging the plane surface 65 on the front of the column 62.

The end portion 70 of the shaft 66 is threaded and adapted to be received in the threaded bore 71 in a V block 72. The V block 72 comprises a metal member which is provided on its front side 73 with an accurately ground plane surface surrounding the threaded bore 71. The threaded shaft 66 may be threaded into the bore 71 by means of the hand wheel 67 to clamp the V block 72 against the column 62 in any desired angular position.

The V block 72 may be of substantially rectangular cross section, and may be provided with flat rectangular sides 74, 75, but on its rear side it is provided with a V shaped groove 76. The V shaped groove is defined by a pair of diagonally inwardly extending walls 77 and 78.

These walls preferably extend from the bottom to the top of the V block 72 so that a tool may be received in the V groove 76, and it may project from the top thereof.

In order that a tool to be sharpened or ground, such as the end milling cutter 79, may be secured in the V groove 76, the V block 72 preferably supports a stirrup 80, which has a threaded bore 81 for supporting a threaded member 82.

The stirrup 80 may consist of one or more pieces, but in the embodiment illustrated it consists of a pair of metal side legs 83, 84 and a yoke 85 carried at their ends. Screw bolts 86 secure the yoke 85 to the side legs and the legs 83, 84 to the V block 72 in each case.

The screw bolts pass through apertures in the legs, and are threaded into the V block 72 or the yoke 85.

The threaded member 82 comprises a threaded shaft, which may be formed with a ball 87 at its inner end, the ball being received in a socket 88 of a shoe 89. The walls of the shoe 89 surrounding the socket 88 may be spun or peened over at 90 to engage the adjacent side of the ball so that the shoe is rotatably mounted on the ball 87 of threaded shaft 82.

The shoe 89 may comprise a bar of substantially rectangular shape in cross section and may have three flat sides, but on the side adjacent the tool 79 it is also preferably provided with a V groove 91.

The V groove 91 is defined by the two side walls 92, 93 at an angle to each other. The angularity of the V grooves 76 and 91 may be varied, but is preferably approximately at right angles so that a square shank may be firmly grasped, as well as a round shank, such as that illustrated at 79.

It should also be noted that the walls 76 and 78 of the V groove 76 in the block 72 have their apex extending substantially parallel to the plane surface 64 on the front of the column 62. Thus the shank of a tool 79 is held at substantially 89°, 30′ to the horizontal plane. The shank diverges 30′ from the vertical when the fixture is placed upon the table 26. That divergence is such as to tilt the cutter 79 toward the back at the top so that the cutting edge 94 will be automatically ground deeper at its inner end 95 than its outer end 96 (Fig. 9). Naturally, the angularity in Fig. 9 is exaggerated for the purpose of illustration.

Although an end milling cutter has been chosen for the purpose of illustration of the operation and use of my grinding machine, it should be understood that various types of cutters may be sharpened. The end milling cutter 79 may be a single or double ended cutter, but in the embodiment illustrated it is provided at its lower end in Fig. 5 with a plane cylindrical shank 97. By a double ended cutter I mean one which has cutting edges on both ends, as distinguished from the cylindrical shank shown at 97 in Fig. 5.

Such a cutter may also be provided with one or two, three, four, five, six, or more cutting edges; but it is preferably provided with at least two so that the cutting edges will be balanced; and in any event, the cutting edges are preferably spaced at equal angles from each other for the same reason.

In the embodiment illustrated, a cutter has been taken having two cutting edges 94 and 98. I prefer to provide such cutters with a small cavity 99 at the center of its end between the cutting edges 94 and 98 for the purpose of indicating more readily the extent to which the grinding of each edge must go. This is not absolutely necessary because even though the grinding of either of the edges 94 or 98 may be carried past the center of the cutter 79, such an imperfection will not affect the operation of the cutter because the major part of the cutting is done with that part of the blade adjacent the outer corner 96 or 100 of each cutting edge 94, 98.

The cutters have their edges formed with a land 101 (Fig. 7), which slopes downward in Fig. 7 with respect to the cutting edge 94, and the angularity of this land is determined by the position of the V block 72 on the column 62. Beyond the land 101 the end of the end milling cutter is provided with a further bevel or relief 102, which is for the purpose of providing the cutting part of the tool with a suitably tapered body.

The end milling tools have the usual spirally extending grooves 103, 104 that are also present in a drill bit for receiving the cuttings and conducting them out of a drilled aperture.

Referring again to Fig. 5, at its lower end the V block 72 is preferably provided with a plurality of cylindrical bores 105, 106, 107. These bores are adapted to receive a stop member or rest 108, comprising a rod having a tight frictional fit in any of the bores 105, 107, and having a laterally extending handle 109, comprising a smaller rod, which passes through a bore in the stop rod 108.

The stop member 108 serves as a support for the lower end of the tool 97, against which the tool reacts to prevent it from sliding down in the V block 72, while it is being ground.

Since the spindle 27 may be adjusted and secured at any desired height, it is not necessary to provide an adjustable mounting for the V block 72, but the apertures 105, 107 for the rest 108 provide convenient adjustments for tools of different standard lengths so that it may not be necessary to change the position of the spindle 27 in the head when these standard length tools are sharpened.

The V block 72 is also provided at its lower end with a V shaped pointer 40, and the column 62 may be provided with indicia 111, comprising scale divisions and numbers indicating the angularity. These numbers both begin from zero in the middle, which indicates the vertical position; and the scale divisions are of such size that they may indicate degrees or parts of degrees of the angular position of the V block 72 on the column 62.

Figure 5:
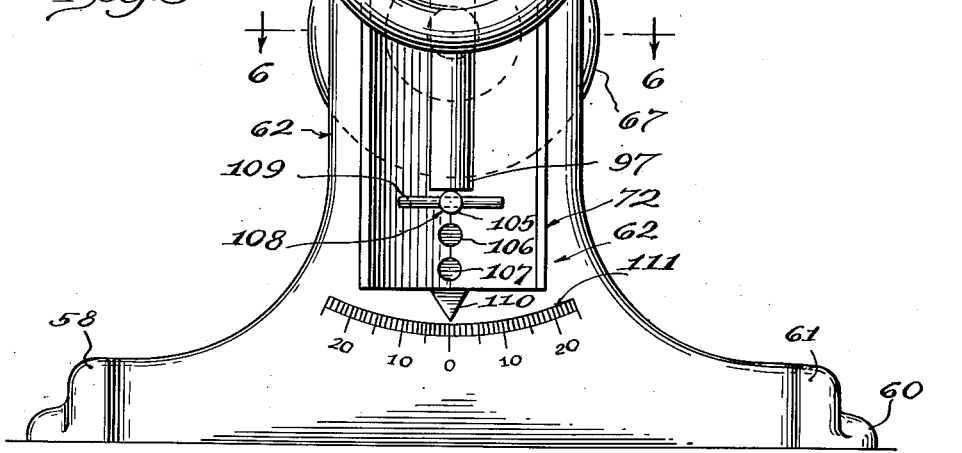
Fig. 5 is an elevational view of the fixture, taken from the front of Fig. 4.

In order to support the tool against rotation, which might be caused by the action of the grinding wheel on the tool, while it is being held in the V block, I prefer to provide an adjustable stop member, indicated in its entirety by the numeral 112 (Figs. 4 and 5). This stop member may comprise a supporting rod 113, which is slidably mounted in a transverse cylindrical bore 114 extending through the V block 72 adjacent its upper end, and preferably parallel to the plane surface 59 on the base.

The rod 113 may be secured in any adjusted position by means of a set screw 115 engaging the rod and threaded into a threaded bore 116 in the back of the V block, where it projects above the column.

Since the rod 113 may be inserted either from the left or the right, it will be evident that my stop member 112 may be used for either right hand or left hand tools. The rod 113 is provided at its outer end with an enlargement having a transverse cylindrical bore 116 for slidably receiving an upwardly extending rod 117, which is secured in the bore by means of a set screw 118.

The rod 117 likewise has an enlargement at its opposite end provided with a bore 119 for slidably receiving the cylindrical shank 120 of the stop member 112. The cylindrical shank 120 is again secured in place by means of a set screw 121 threaded into a bore in the rod 117 and engaging the shank 120.

The shank 120 is provided with a slot in its end, within which is welded a thin piece of spring steel 122. The spring steel member 122 may taper toward its end and be provided with a rounded end portion 123 for engaging the side of the wall of a tool inside the groove that is caused by the twist.

The stop member 112 prevents the tool from rotating in a clockwise direction in Fig. 4; but, if the hand wheel 124 is rotated counterclockwise to loosen the shoe 89 slightly, the tool may be turned in the V groove 76 by hand until it snaps past the blade 122, when it can be rotated backward against the end 123 of the stop member 112 and secured again by means of the hand wheel 124.

The grinding wheel in Fig. 1 and Fig. 2 is rotated in a clockwise direction, looking from the bottom; and therefore the wheel is grinding against the edge 94 of Fig. 4, tending to cause the tool to rotate in a clockwise direction, looking from the top of the tool. Thus the stop member 112 is properly located to prevent this rotating movement of the tool in its V groove, and the stop member 112 is adapted to assure the permanent location of the cutting edge which is to be ground during the grinding operation.

By means of the three rods 120, 117 and 113, the blade 112 may be placed in practically any desired location or elevation.

The mode of operation of my grinding machine is as follows: The tool has its shank clamped in the V groove 76 by means of the shoe 89, which is driven by the screw 82. The lower end of the tool rests on the support given it by the pin 108.

The grinding wheel has its shank secured in the chuck 40, and the table 26 of the drill press is adjusted at the desired height. The proper angle for hollow grinding the edges 94 and 98 is provided by the fact that the base of the tool holds the column at an angle of 89°, 30'. The proper angle for the clearance of the lands 101 is provided by loosening the screw bolt 66 by means of hand wheel 67 and turning the V block 72 on the column until the proper angularity is indicated at indicia 110, 111. Then the V block is clamped in place by means of hand wheel 67.

The fixture is then mounted on the table 26 of the drill press and is preferably located with the tool substantially aligned with the arbor 27. The arbor is moved down by means of the handle 37 until it is in position to take a small cut off the end of the tool.

Then the spindle is clamped in that position by the clamping means 39. At this time the fixture is disposed with the tool in front of the grinding wheel; and with the grinding wheel rotating preferably at its maximum speed, the operator need only to push the fixture so that it will slide on the table 54, and the end of the tool will be fed under the grinding wheel, as shown in Fig. 2.

This feeding movement should be continued until the grinding of the edge on one side of the tool is finished. I prefer to form the tool with a slight cavity at 99, providing a definite end for the inner end of each cutting edge.

This is not absolutely necessary, and the operator may gauge with his eye the proper distance to which the grinding should be carried, that is, approximately the center of the tool. After this the fixture is pulled out from under the grinding wheel. The hand wheel 124 is slightly loosened, and the tool is rotated in the V block and moved back against the spring blade 122 again, after which the hand wheel 124 is tightened to hold it in place.

As the tool rotates, the spring blade 122 snaps over the twisted portions of the tool. Then the next blade may be ground again in the manner shown in Fig. 2, by moving the fixture under the grinding wheel until the grinding wheel reaches the center of the tool.

If there are more than two cutting edges, the operation is again repeated for each cutting edge. The operator is able to watch the grinding as it proceeds, and all of the cutting edges will be ground to the same height, provided the tool is not again reset between the grinding of the various cutting edges.

My method of grinding end milling cutters and similar tools may be summarized briefly as follows: The grinding wheel may be rotated by means of the spindle of a drill press or some other tool which has a table located under it. The end milling cutter may be fixedly held under the grinding wheel on the drill press table by any convenient supporting device which is adapted to hold it securely and slide on the table of the drill press.

The tool is held at a predetermined angle to its present cutting edge so that it may be ground lower on that part of the cutting edge which is nearer the center of the tool. For this purpose the tool is tilted with its upper end toward the grinding wheel approximately 30' from the vertical.

The tool also has its axis tilted laterally with respect to the spindle of the grinding wheel an amount which depends upon the clearance desired behind the cutting edge. With the grinding wheel rotating at a relatively high speed, the tool is then slid under the grinding wheel while being supported on the table of the drill press, and the sliding movement is continued until the cutting edge of the tool, which is on the side toward the grinding wheel, is ground to the center of the tool.

Without changing the setting or other position of the tool, it is then rotated in its support until another cutting edge is presented in the same way. Thus all cutting edges may be hollow ground and ground to the same elevation without necessity for complicated grinding tools of the prior art, which were usually very expensive and adapted only for one or two types of tools.

While various speeds may be used, it is well known that the grinding wheels should be driven at relatively higher speeds, and I prefer to use about 2,000 R. P. M. with a four inch wheel. This is well within the range of most drill presses, and thus it is not necessary to purchase any new equipment other than the fixture indicated at 53 and the grinding wheel.

It will thus be observed that I have invented an improved grinding machine assembly, by means of which end milling cutters and other kinds of tools that cut on the end may be sharpened, and this equipment may be utilized with any ordinary drill press having the usual adjustments.

It is not necessary for the user to have the grinding apparatus of the prior art, which usually includes means for complete guiding of the tool with respect to all of its components of movement. As distinguished from the devices of the prior art in which the complexity of the equipment requires considerable time for setting up before actual grinding can proceed, the present device is very simple and relatively inexpensive. The fixtures utilized in my assembly may be manufactured so economically that they can be purchased by small shops where the quantity of end mills to be ground is very small and where the devices of the prior art could not be economically employed.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a device for grinding tools, the combination of a support having a lower work-supporting table provided with a plane upper surface and having above said table a vertically extending arbor rotatably mounted on said support and provided with a chuck, power driven means for rotating said arbor, said arbor being rotatably mounted in a vertically moving bearing and manual means for moving said bearing in a vertical direction, a grinding wheel carried by said chuck, and a tool grinding fixture, said tool grinding fixture comprising a body member having a substantially U-shaped base member with a lower plane surface for sliding support upon said table, a column carried by said fixture, and means for gripping a tool on said column, said gripping means being tiltable on a substantially horizontal axis to an acute angle to the lower surface of the grinding wheel, said column being disposed at an acute angle to the supporting surface of its base.

2. In a device for grinding tools, the combination of a support having a lower work-supporting table provided with a plane upper surface and having above said table a vertically extending arbor rotatably mounted on said support and provided with a chuck, power driven means for rotating said arbor, said arbor being rotatably mounted in a vertically moving bearing, and manual means for moving said bearing in a vertical direction, a grinding wheel carried by said chuck, and a tool grinding fixture, said tool grinding fixture comprising a body member having a substantially U-shaped base member with a lower plane surface for sliding support upon said table, a column carried by said fixture, and means for gripping a tool on said column, said gripping means being tiltable on a substantially horizontal axis to an acute angle to the lower surface of the grinding wheel, said column being disposed at an acute angle to the supporting surface of its base, and stop means comprising an adjustable and securable finger adapted to engage a shoulder on a tool to resist the tendency of the tool to rotate in said gripping means while the grinding operation is carried on.

3. In a device for grinding tools, the combination of a support having a lower work-supporting table provided with a plane upper surface and having above said table a vertically extending arbor rotatably mounted on said support and provided with a chuck, power-driven means for rotating said arbor, said arbor being rotatably mounted in a vertically moving bearing and manual means for moving said bearing in a vertical direction, a grinding wheel carried by said chuck, with a fixture comprising a body member having a substantially U-shaped base with a lower plane surface adapted to slide on said table, said fixture having an upwardly extending column located at an acute angle to said plane surface, a grooved tool-holding member carried by said column, and means for clamping a tool in said member, an adjustable stop member for supporting the tool against rotation while it is being ground, said tool-holding member being mounted for rotation on a substantially horizontal axis, and indicia on the body member for indicating the angular position of said tool-holding member with respect to said column.

BRANDT FORD.